United States Patent [19]

Bartelmuss

[11] 4,164,442

[45] Aug. 14, 1979

[54] ABRASION-RESISTANT PLATE

[76] Inventor: Heinrich Bartelmuss, A-8833 Teufenbach 63,, Steiermark, Austria

[21] Appl. No.: 807,330

[22] Filed: Jun. 16, 1977

Related U.S. Application Data

[62] Division of Ser. No. 631,618, Nov. 13, 1975, Pat. No. 4,047,993.

[51] Int. Cl.² .................... C04B 35/00; D21F 1/52
[52] U.S. Cl. ............................ 162/352; 162/374; 428/49; 428/53; 428/220
[58] Field of Search ............... 162/352, 374, 351; 428/45, 49, 52, 53, 54, 56, 220, 446; 156/89, 91, 304; 228/121, 138; 106/44

[56] References Cited

U.S. PATENT DOCUMENTS

| | | | |
|---|---|---|---|
| 1,282,029 | 10/1918 | Bemis | 106/44 X |
| 2,740,332 | 4/1956 | Van Ryzin | 162/374 |
| 3,067,816 | 12/1962 | Gould | 162/374 |
| 3,360,429 | 12/1967 | Proulx | 162/374 X |
| 3,393,124 | 7/1968 | Klingler et al. | 162/374 X |
| 3,436,306 | 4/1969 | Haberecht et al. | 162/374 |

FOREIGN PATENT DOCUMENTS 1082921 9/1962 United Kingdom .................. 162/374

*Primary Examiner*—Richard V. Fisher
*Attorney, Agent, or Firm*—Karl F. Ross

[57] ABSTRACT

A solid or perforated plate, serving as a support for a screen conveyor in paper-making machinery or the like, consists of a multiplicity of juxtaposed coplanar sections of sintered refractory, predominantly ceramic material joined to one another by thin layers of a bonding agent. The ceramic component, e.g. alumina, may be admixed with a small proportion of a vitreous substance facilitating the use of a siliceous bonding agent, such as glass, enamel or silicon carbide. Alternatively, the bonding agent may be a solder (with preliminary metallization of the adjoining section edges) or an organic cement.

8 Claims, 12 Drawing Figures

ABRASION-RESISTANT PLATE

This is a division of application Ser. No. 631,618, filed Nov. 13, 1975, now U.S. Pat. No. 4,047,993 issued Sept. 13, 1977.

FIELD OF THE INVENTION

My present invention relates to an abrasion-resistant plate, to be used for example as a support for a moving wire screen in paper-making equipment or the like.

BACKGROUND OF THE INVENTION

In recent years the use of hard, dense ceramic materials on surfaces subjected to the abrasive action of screen conveyors or other moving metallic elements has become rather widespread. U.S. Pat. No. 3,067,816, for instance, describes the utilization of self-bonded and metal-bonded ceramics on suction-box covers underlying the upper run of a screen conveyor carrying a slurry of wood pulp and water in a Fourdrinier paper-making machine. Later developments, e.g. as described in Austrian Pat. Nos. 279,334, 280,034, 280,035, 280,036 and 313,697, involve the use of sintered ceramics for such purposes.

Such supports, which in paper-making equipment have to extend across the full width of the transport path for the slurry, generally have lengths of several meters. Depending on their use as drainage elements or as simple supporting strips, they may or may not be slotted or otherwise perforated. In any case it is necessary, for practical reasons, to manufacture them in a multiplicity of relatively short sections adjoining one another along generally transverse lines which, as shown in the above-identified U.S. patent, may include an acute angle with the transport direction.

Unavoidable manufacturing tolerances and warping of these relatively thin plate sections prevent their accurate alignment without intervening gaps in a mounting frame unless each section is carefully machined to its specified dimensions prior to assembly; such machining, of course, greatly increases the production costs. Furthermore, the clamping stresses exerted by the mounting frame may cause some of the section edges to rise up from the plate surface, thereby damaging the screen passing thereover.

OBJECTS OF THE INVENTION

An important object of my present invention, therefore, is to provide such abrasion-resistant plates with avoidance of the aforestated drawbacks.

A related object is to provide a compound plate of the general character described whose sections adjoin one another without objectionable discontinuities and form a unitary body adapted to be used, with or without preliminary truing of its contour, as a throughgoing supporting strip, suction-box cover etc. (or as at least a major portion of such a throughgoing member) in paper-making equipment and similar machinery.

SUMMARY OF THE INVENTION

In accordance with my present invention, a multiplicity of flat plate sections of like width and thickness are sintered from a comminuted refractory, predominantly ceramic material, in a manner known per se, and are then closely juxtaposed in coplanar relationship with formation of narrow gaps between their confronting, coextensive edges. Next, each gap is completely filled with a bonding agent after which the sections are united into a continuous body by causing that bonding agent to adhere to them, with or without the application of heat and/or pressure according to the nature of the bonding agent chosen.

By "predominantly ceramic" I mean a refractory material consisting of a major extent, i.e. in an amount of about 90% by weight and more, of alumina, silicon carbide, zirconia, tungsten carbide, boron carbide, titanium carbide, zirconium carbide, titanium boride or zirconium boride, or combinations thereof, which can be admixed with a minor proportion of vitreous substances, including one or more silicates or constituents thereof. I have found that, in the presence of even a small percentage (e.g. 1–3%) of such vitreous substances within the sintered material, a practically monolithic body can be produced with the aid of a thermally fusible siliceous composition such as glass or enamel serving as the bonding agent. Silicon carbide may also be used, advantageously by melting pieces of graphite in the inter-section gaps in an atmosphere of silicon vapor which reacts with the carbon, the product adhering to the adjoining ceramic sections. Alternatively, various metals or alloys commonly used for soldering purposes may serve as the bonding agent. In that instance, however, it is desirable that the confronting section edges be metallized, e.g. by sputtering in an inert atmosphere or under vacuum, before the bonding step. Organic cements of the solvent-free one-component type, such as cold-hardening cyanoacrylate compositions, or of the two-component type with an epoxy or polyester base, for example, are also available. In all instances, however, the bonding layer should be so thin as to prevent any significant elastic deformation; thus, it should generally be a film of not more than 0.1 mm thickness. The tensile strength of the joint, after full curing of the bonding agent, ought to be not less than 250 kg/cm$^2$.

In order to minimize the effect of thermal stresses during the sintering and/or the bonding step upon the shape and the continuity of the plate sections, they ought to have a minimum thickness of about 1.2 mm which should not be less than approximately 1/40 of the largest dimension (width or length) of any section. Any beads formed at the joints by the bonding agent may be removed by grinding and polishing, if necessary.

Maintenance of the coplanar relationship of the plate sections during the bonding step may be insured with the aid of thin pins, disks and similar inserts bridging the members between the sections and extending partly into same. It is also possible to provide the adjoining edges with complementary serrations or other formations designed to maintain their correct relative position.

A preferred refractory material, suitable for use with vitreous bonding agents, consists essentially of alumina admixed with sodium, potassium, calcium and/or magnesium silicates (or their constituents) in a combined proportion of 1 to 3% by weight. Typical compositions of this nature are as follows:

EXAMPLE I

| | |
|---|---|
| $Al_2O_3$ | 98.25% |
| $MgO$ | 0.25% |
| $CaO$ | 0.01% |
| $SiO_2$ | 0.96% |
| $Fe_2O_3$ | 0.07% |
| $K_2O$ | 0.096% |
| $SO_3$ | 0.126% |

-continued

| | |
|---|---|
| Na$_2$O | 0.238% |

EXAMPLE II

| | |
|---|---|
| Al$_2$O$_3$ | 97.5% |
| MgO | 0.35% |
| CaO | 0.23% |
| SiO$_2$ | 1.2% |
| Fe$_2$O$_3$ | 0.14% |
| K$_2$O | 0.1% |
| SO$_3$ | 0.13% |
| Na$_2$O | 0.35% |

BRIEF DESCRIPTION OF THE DRAWING

The above and other features of my invention will now be described in detail with reference to the accompanying drawing in which.

SPECIFIC DESCRIPTION

Figure 1:
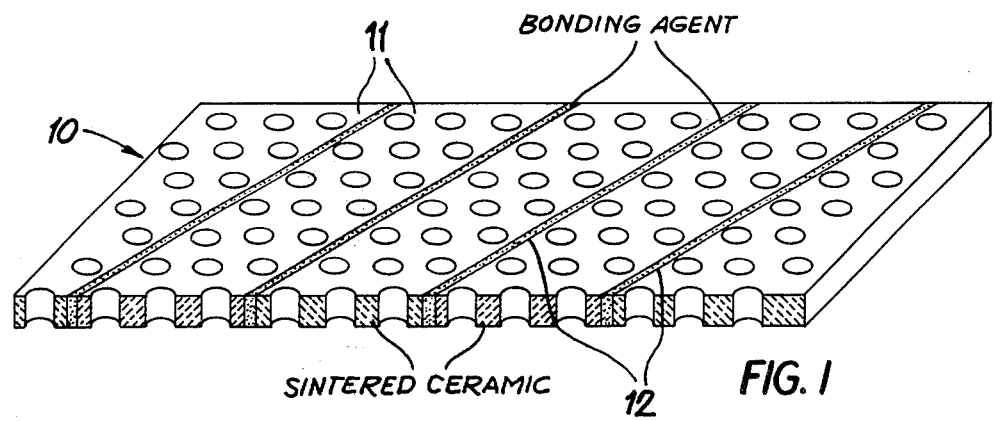
FIG. 1 is a perspective view, in longitudinal section, of a compound abrasion-resistant plate embodying my invention.

In FIG. 1 I have shown a compound plate 10 composed of a multiplicity of perforated sections of sintered refractory material 11 adjoining one another along oblique lines, in the general manner shown in U.S. Pat. No. 3,067,816 referred to above. A bonding agent 12, of one of the types already discussed or more specifically referred to hereinafter, fills the gaps between these sections. Thus, plate 10 constitutes a unitary body which, if necessary, can be trimmed or machined along its periphery in order to fit into a mounting frame or onto a supporting member such as those described below in connection with FIGS. 8–12.

Figure 2:
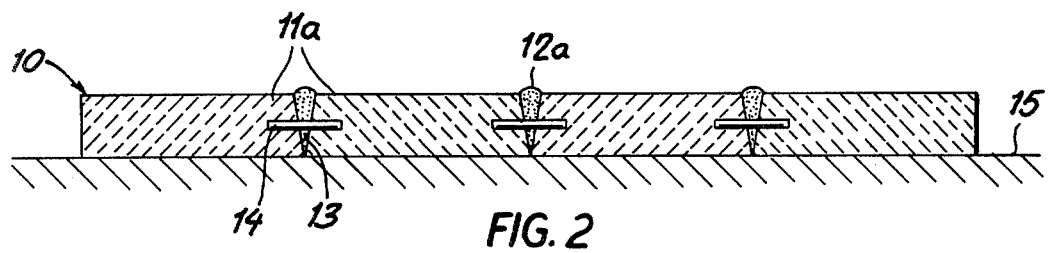
FIG. 2 is a longitudinal sectional view of a similar plate.
Figure 12:
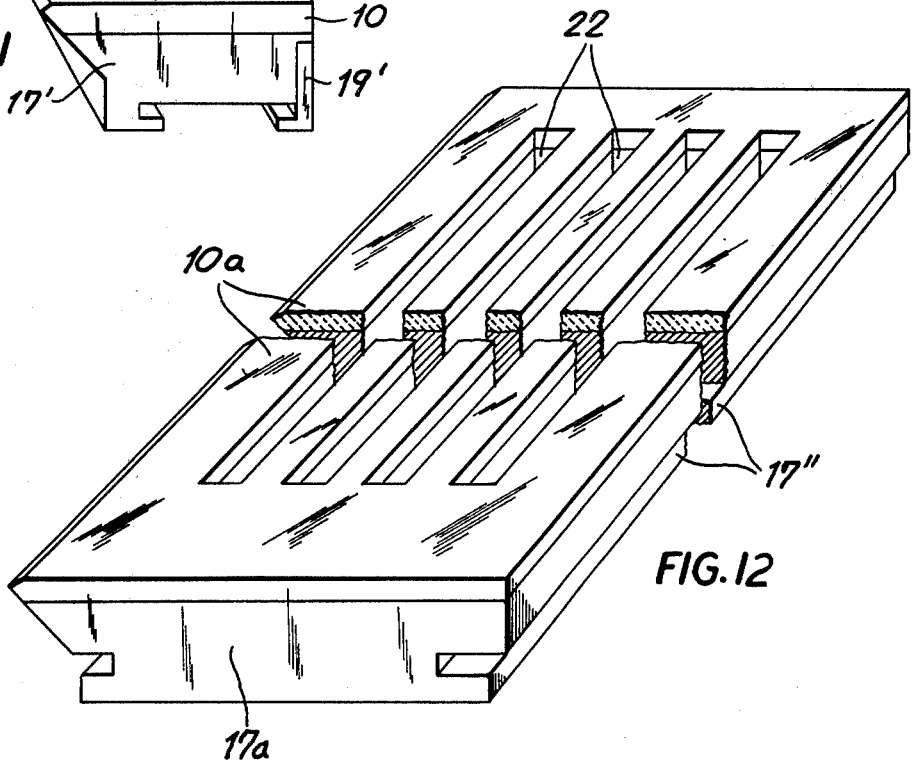
FIG. 12 is a perspective view of a modified assembly of this type forming part of a drainage unit.

In FIG. 2 I have shown a plate 10 whose sections 11a form wedge-shaped gaps 13 occupied by a bonding agent 12a, these gaps being bridged by inserts 14 partly embedded in the adjoining sections 11a. These inserts could have the shapes of pins, as illustrated at 14' in FIG. 3, or of disks, as shown at 14" in FIG. 4. They could also be threaded or corrugated and could be partly embedded in one section of the associated pair during the sintering thereof, being then fitted into corresponding bores or recesses in the other section. Sections 11a are shown in FIG. 2 to rest on a substrate 15 (e.g. a table) during the bonding process. The bonding layers 12a project slightly above the upper plate surface so as to form ridges or beads which, if necessary, can be mechanically removed. Such removal, however, may not be required if the beaded surface becomes the seat of an adhesive layer by which the plate 10a is permanently attached to another structural member, e.g. as shown in FIG. 12.

Figure 3:
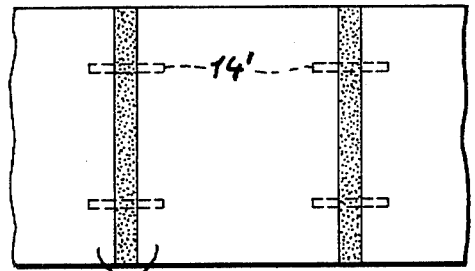
FIGS. 3, 4 and 5 are fragmentary top views of such plates, showing certain modifications.
Figure 4:
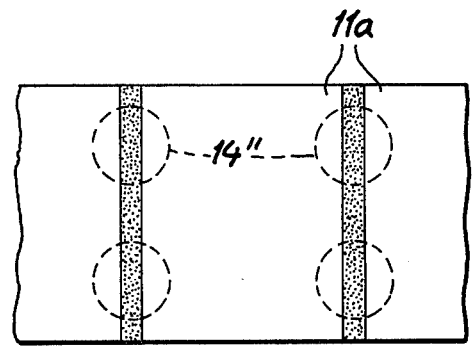
Figure 5:
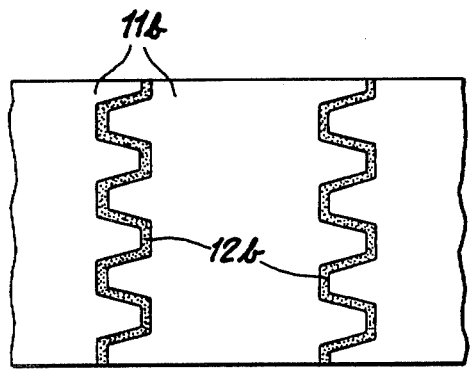

FIG. 5 shows plate sections 11b with serrated edges separated by a meandering gap occupied by a bonding agent 12b. Naturally, such an edge configuration could also be combined with stabilizing inserts and wedge-shaped gaps as illustrated in FIGS. 2–4.

Figure 6:
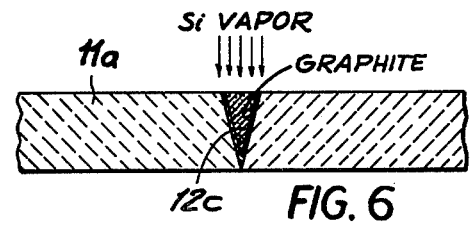
FIG. 6 is a cross-sectional view of a pair of adjoining plate sections, showing the bonding thereof in the manufacture of a plate of the type illustrated in FIGS. 1–5.

The various plate sections 11, 11a, 11b of FIGS. 1–5 may conform to the composition given above in EXAMPLE I or II. In that case the bonding agent 12, 12a or 12b is preferably a glass or an enamel. It is also possible, as illustrated in FIG. 6, to introduce pieces of graphite 12c into a gap between two sections 11a (or 11, 11b) and to heat them with silicon vapor to form the reaction product SiC serving as a bonding agent.

Figure 7:
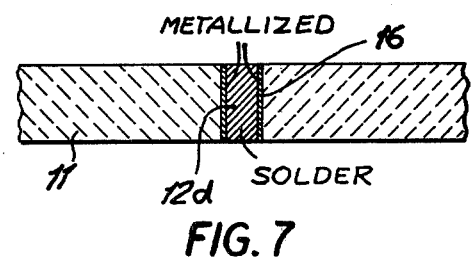
FIG. 7 is a view similar to FIG. 6, illustrating a modified bonding operation.

FIG. 7 shows plate sections 11 with metallized edges 16 which are bonded together with a film of soft or hard solder 12d.

Figure 8:
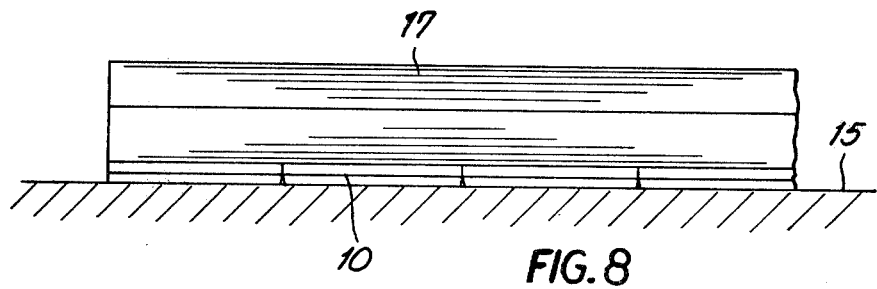
FIG. 8 is a side-elevational view of a compound plate according to my invention together with a supporting structure therefor.
Figure 9:
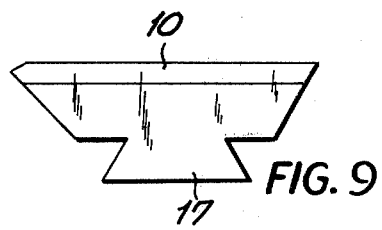
FIG. 9 is an end view of the assembly shown in FIG. 8.
Figure 10:
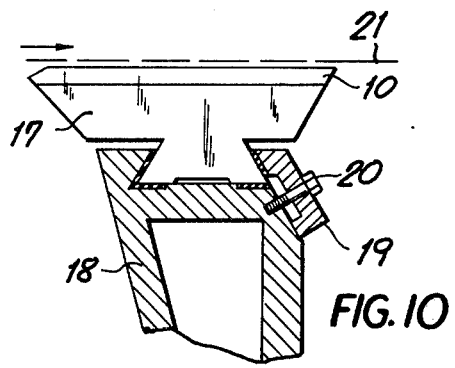
FIG. 10 is a view similar to FIG. 9, showing the mounting of that assembly on a machine bed.
Figure 11:
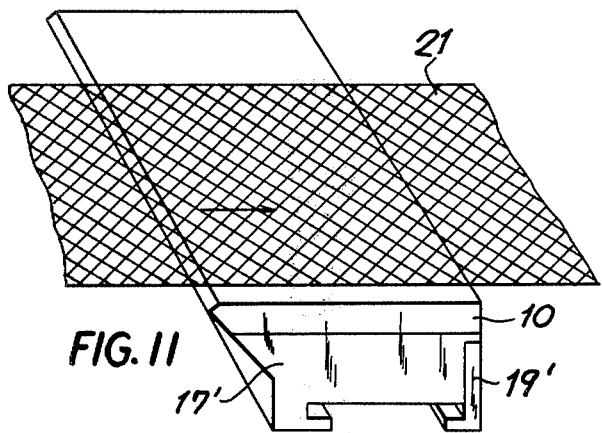
FIG. 11 is a perspective view illustrating the combination of a generally similar assembly with a wire-screen conveyor in a paper-making machine.

In FIG. 8 I have shown a plate 10 placed upside down on the substrate 15, together with a base member 17 to which the plate is secured adhesively or in some other manner. The assembly 10, 17 has been shown righted in FIG. 9 and mounted on a machine bed 18 in FIG. 10, being held in position by a strip 19 with the aid of screws 20 (only one shown). A screen 21, representing the upper run of an endless sludge conveyor, passes closely above the plate 10 which together with its base 17 forms one of several transversely spaced supporting strips therefor. The base 17 extends across the full width of the screen, as illustrated for a similar base 17' with mounting strip 19' in FIG. 11; if desired, however, plate 10 may be one of two or three such compound plates positioned end to end, each covering half or one third of the base surface.

In FIG. 12 I have shown a generally similar assembly 10a, 17a provided with slots 22 for the drainage of water from a slurry carried by an overlying screen which has not been illustrated in this Figure.

In all instances in which the bonding agent must be softened at high temperatures, the heating may be carried out with the aid of a plasma flame, a blow torch or an electric arc passing across the gap between the sections to be interconnected, under a protective atmosphere or in a vacuum if necessary. It is also possible to inject the bonding agent at an elevated temperature into the gap, e.g. by a flame-spraying technique. If required, pressure may be exerted upon the joint during the curing step.

The joints thus formed between adjacent plate sections are firm, stiff and airtight so that no vacuum losses occur if such a plate is used as a wall of a suction box or the like.

I claim:

1. An abrasion-resistant plate divided into a multiplicity of flat, coplanar and closely juxtaposed sections of like width and thickness consisting of sintered refractory material with a predominant ceramic component including at least one silicate in a proportion of up to 3% by weight, said sections having confronting coextensive edges forming narrow gaps therebetween, and a bonding agent of silicon carbide completely filling said gaps while uniting said sections into a continuous body.

2. A plate as defined in claim 1 wherein said sections have a thickness not less than about 1/40 of their largest dimension.

3. A plate as defined in claim 2 wherein said thickness is at least 1.2 mm.

4. A plate as defined in claim 1, further comprising gap-bridging inserts partly extending into adjoining sections.

5. A plate as defined in claim 1 wherein said confronting edges are provided with interfitting formations.

6. A plate as defined in claim 1 wherein said refractory material consists essentially of alumina admixed with the constituents of sodium, potassium, calcium and magnesium silicates in a combined proportion of 1 to 3% by weight.

7. In paper-making machinery, in combination, an endless screen with an upper run forming a carrier for a slurry of wood pulp and paper, and a support for said upper run comprising at least one abrasion-resistant plate perpendicular to said screen subdivided into a multiplicity of flat, coplanar and closely juxtaposed sections of like width and thickness consisting of sintered refractory material with a predominant ceramic component including at least one silicate as a minor component in a proportion of up to 3% by weight, said sections having confronting coextensive edges generally parallel to the direction of screen motion forming narrow gaps therebetween, and a bonding agent of silicon carbide completely filling said gaps while uniting said sections into a continuous body.

8. The combination defined in claim 7 wherein said refractory material consists essentially of alumina admixed with the constituents of sodium, potassium, calcium and magnesium silicates in a combined proportion of 1 to 3% by weight.

* * * * *